(12) United States Patent
Kurjenniemi

(10) Patent No.: US 6,760,598 B1
(45) Date of Patent: Jul. 6, 2004

(54) METHOD, DEVICE AND SYSTEM FOR POWER CONTROL STEP SIZE SELECTION BASED ON RECEIVED SIGNAL QUALITY

(75) Inventor: Janne Kurjenniemi, Jyvaskyla (FI)

(73) Assignee: Nokia Corporation, Espoo (FI)

( * ) Notice: Subject to any disclaimer, the term of this patent is extended or adjusted under 35 U.S.C. 154(b) by 84 days.

(21) Appl. No.: 10/138,025

(22) Filed: May 1, 2002

(51) Int. Cl.[7] .................................................. H04Q 7/20
(52) U.S. Cl. ..................... 455/522; 455/127.1; 370/318
(58) Field of Search ............................. 455/522, 127.1, 455/69, 70; 370/252, 318, 320, 335

(56) References Cited

U.S. PATENT DOCUMENTS

| | | | | |
|---|---|---|---|---|
| 5,745,520 A | * | 4/1998 | Love et al. ................. | 375/130 |
| 5,896,411 A | * | 4/1999 | Ali et al. .................... | 375/130 |
| 5,943,610 A | * | 8/1999 | Endo .......................... | 455/69 |
| 6,075,974 A | * | 6/2000 | Saints et al. ................. | 455/69 |
| 6,084,904 A | | 7/2000 | Wang et al. | |
| 6,104,918 A | | 8/2000 | Saario et al. | |
| 6,151,508 A | * | 11/2000 | Kim et al. ................... | 455/522 |
| 6,208,873 B1 | * | 3/2001 | Black et al. ................. | 455/522 |
| 6,212,399 B1 | | 4/2001 | Kumar et al. | |
| 6,311,070 B1 | | 10/2001 | Tong et al. | |
| 6,334,047 B1 | * | 12/2001 | Andersson et al. .......... | 455/69 |
| 6,418,137 B1 | * | 7/2002 | Bontu et al. ................ | 370/347 |
| 6,628,958 B1 | * | 9/2003 | Kamel et al. ............... | 455/522 |

FOREIGN PATENT DOCUMENTS

| | | | | |
|---|---|---|---|---|
| EP | 1 073 213 A1 | * | 1/2001 | .......... H04B/7/005 |
| GB | 2 355 887 A | * | 5/2001 | .......... H04B/7/005 |

* cited by examiner

*Primary Examiner*—Charles Appiah
(74) *Attorney, Agent, or Firm*—Ware, Fressola, Van Der Sluys & Adolphson LLP

(57) ABSTRACT

A method, device and system, for determining downlink transmission power step size for both UP and DOWN transmission power control commands (TPC). The method, device and system use reception quality and a plurality of thresholds to determine these step sizes. Provision is made for determining step size and the TPC command values when the TPC command is evaluated to be erroneous and when reception quality is less than a minimum threshold value.

35 Claims, 5 Drawing Sheets

METHOD, DEVICE AND SYSTEM FOR POWER CONTROL STEP SIZE SELECTION BASED ON RECEIVED SIGNAL QUALITY

TECHNICAL FIELD

The present invention is directed to downlink transmission power control and specifically to such power control related to Universal Terrestrial Radio Access (UTRA) Time Division Duplex (TDD) Downlink (DL) Power Control (PC).

BACKGROUND OF THE INVENTION

Closed loop power control (also called inner loop control) is used for downlink (DL) transmission power control of the base station (BS). Such power control should minimize DL transmitted energy (minimize the signal-to-interference (SIR) at the user equipment (UE)) while maintaining quality of service at the UE. It should also maintain received signal power at the UE at a constant level at all times.

In operation the user equipment (UE) measures the signal-to-interference ratio (SIR) and according to that measurement, sends a transmission power control command (TPC) to the base station (BS). The base station then adjusts transmission power (TxP) according to the TPC command sent by the UE using a power control step size that is typically signaled from the radio network controller (RNC). The RNC ensures that the BS power level is within limits set by the network configuration. Thus there are certain power control limits, i.e. maximum and minimum transmission powers, that the BS cannot exceed. These power limits are set by radio resource management algorithms. It is of course desirable to adjust the base station transmission power as rapidly as possible in order to have the optimum transmission power level for the UE. However, if the signal-to-interference ratio (SIR) indicates a poorly received signal by the base station, then it may not be prudent to rapidly change the transmission power level, either up or down based upon the TPC command due to the fact that the TPC command may be incorrect. In fact, if the BS misreads the TPC command and interprets it as an UP command, and if the step size for increasing the base station transmission power is large, then a much higher base station transmission power than otherwise necessary for the UE can occur, resulting in degradation to other UEs interfacing with the BS. It is therefore desirable to be able to adjust the base station transmission power in a manner as commanded by the TPC command, but taking into account the reliability of that command based upon a measurement of the quality of the received signal.

SUMMARY OF THE INVENTION

The present invention describes a system and method for transmission power control step size selection which is based on received signal quality and which provides for the ability to independently adjust both the UP step size (StepU) and the DOWN step size (StepD) based upon the quality of the received signal at the base station. By so doing, the adjustment in the base station transmission power is able to minimize the UE receiver signal-to-interference ratio (SIR) of the downlink (DL) associated with a time division duplex (TDD) system. Furthermore, the present invention presents a rule for the behavior of the base station when the reliability of the transmission power control command is low.

In the present invention, when the base station (BS) receives a power control command (TPC) from a user equipment (UE), it evaluates the reliability of the transmitted command based upon the received signal quality of that transmission from the UE. Received signal quality can be based upon signal-to-interference ratio (SIR), or bit error rate (BER). Based on the received signal quality, the system determines the size of the UP step size (StepU) and the size of the DOWN step size (StepD) independently by comparing the received signal quality to different threshold values. In this way, maximum system capacity is realized. It has been found that under good signal conditions the UP and DOWN step sizes can be equal and can both be relatively large (such as 3 dB), but there are also situations where it has been found to be beneficial to choose unequal step sizes for UP and DOWN step sizes. Furthermore, it has been determined that although errors in the TPC command itself can impact the selection of the UP and DOWN step sizes, such errors nevertheless have not been found to change the determination that under certain circumstances the UP and DOWN step sizes should in fact be chosen independently.

Furthermore, under bad reception conditions, such as low SIR for the BS, it has been found beneficial to choose small step sizes for both the UP and DOWN step sizes. It has also been found that when an erroneous TPC command is received (such as the command having the value "01" or "10"), that it is beneficial to interpret such an erroneous command as an UP command (that is, for the base station to increase its downlink transmission power).

More particularly, in a Universal Terrestrial Radio Access (UTRA) time division duplex (TDD) system, users are separated both in the code domain and in the time domain. Due to the time division mode, channel conditions can fluctuate significantly and to such an extent that a slow power control speed (such as 100 Hz) is unable to correct for fast channel fading. This situation is unlike a Wideband Code Division Multiple Access (WCDMA) frequency division duplex (FDD) system where inner loop power control typically has a speed of 1500 Hz. Thus for time division duplex users, it is high desirable to be able to react to rapidly fluctuating conditions. In order to achieve this goal, adaptive power control step sizes for the base station downlink transmission power control are necessary.

When larger step sizes than 1 decibel (dB) are used, the system is more vulnerable to errors in transmission power control (TPC) commands. That is, if the UE is not sending a TPC command requesting an increase in downlink transmission power, but if the BS misinterprets the TPC as an UP command due to bad signal quality, and if for instance, a 3 dB step size is used for increasing the downlink transmission power; if a succession of these power control commands are received erroneously, it is possible that the base station could increase the downlink transmission power to this UE to such an extent that it adversely affects other UEs.

However, by controlling the downlink transmission power step sizes based upon received signal quality of the signal from the UE to the BS, system performance can be increased by using larger step sizes than 1 dB (not necessarily equal to each other) for UP and DOWN changes to the DL transmission power when it is determined that the received signal quality is good while using smaller step sizes (which may also be different in value for UP and DOWN TPC commands) when poorer received signal quality is determined to the BS.

In prior art techniques, the same step size is used for both UP and DOWN TPC commands, such that both the UP and DOWN step sizes could not be changed independently of each other. Thus in UTRA FDD which uses the same type of closed loop power control as used in UTRA TDD, asymmetrical step sizes are not needed since transmission is continuous and power control commands can be sent in every slot, thus providing that power control is better able to follow channel conditions even though using small step sizes for adjustment of the downlink transmission power. However as noted above, in UTRA TDD, the fast fading that can occur in the channel can only be countered in prior art devices by transmitting excessive power by the base station so as to compensate for the slow closed loop power control. This naturally leads to excessive inter-cell interference and is therefore highly disadvantageous.

The present invention provides the ability to modify the step size for both UP and DOWN downlink power control in response to current channel conditions perceived by the base station. When received signal quality is determined to be good, higher than 1 dB step sizes (StepU and StepD) can be used for both increasing downlink transmission power and for decreasing downlink transmission power. Furthermore, StepU and StepD need not be the same; that is, there may be asymmetrical steps for increasing or decreasing downlink transmission power.

However, during moderately bad or bad signal quality situations (channel conditions) asymmetry of step sizes can be eliminated and small step sizes for StepU and StepD can be used to minimize the effect of possible receipt of erroneous power control commands from the UE. This methodology is used only in the base stations and therefore does not require any additional signaling. Furthermore, this methodology does not require the radio network controller (RNC) to signal to the base station the step size to be used by the base station since the base station is able to select both the UP and DOWN step sizes independently of the RNC based upon perceived channel quality. Thus the need for additional signalling over the Iub interface (between the BS and RNC) is eliminated. However, the RNC continues to control the BS behavior to the extent that the maximum transmission power control step size is signalled from the RNC to the BS. According to current 3GPP specifications, the RNC signals the used step size to the BS, so that this value can be interpreted as a maximum step size when the BS has the ability (as in the present invention) to select appropriate step size independently based on received signal quality.

Although it might be, difficult to predict optimal step sizes for UP and DOWN power control in view of different environmental and channel conditions, it has been found through experimentation that there is a clear advantage in the potential use of asymmetrical step sizes. Nevertheless, selection of step size sizes for both UP and DOWN power control typically requires a channel dependent optimization.

Furthermore in the methodology according to the present invention, signal-to-interference ratio (SIR) measurement accuracy is not analyzed, but at reasonable operation levels the SIR or BER measurement is deemed reliable and thus the effect to system performance is small. In other words, at reasonable operation levels the UEs and BSs are configured so as to perform accurate measurements so that the effect to system capacity will be small, i.e. degradation in system performance should be very small because of any inaccuracy in various measurements.

BRIEF DESCRIPTION OF THE DRAWINGS

For a fuller understanding of the nature and objects of the present invention, reference is made to the following detailed description, taken in conjunction with the following drawings, in which.

BEST MODE FOR CARRYING OUT THE INVENTION

Figure 1:
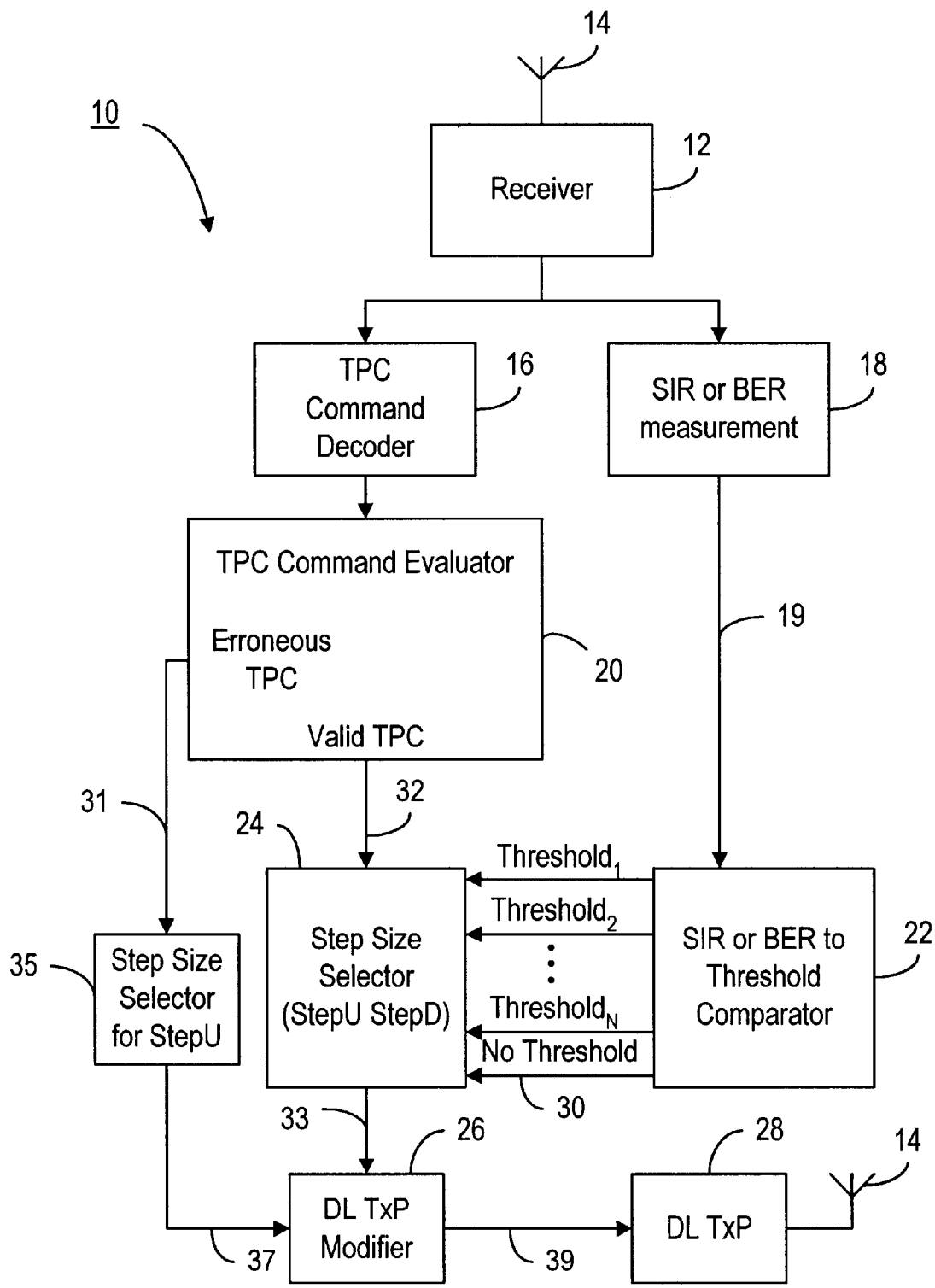
FIG. 1 is a block diagram of the power control step size selection portion of a base station according to the present invention.

FIG. 1 is a block diagram of a portion 10 of base station, in particular that portion used for downlink transmission power control in accordance with the present invention. As there seen, it comprises a receiver 12 for receipt of radio frequency signals from the user equipment (UE) via antenna 14, a transmission power control command (TPC) decoder 16 for determining the value of a TPC command, a reception quality measurement module 18 for determining the reception quality of the radio frequency signal received via antenna 14, a TPC command evaluator 20 for determining if the TPC command is or is not erroneous, a reception quality to threshold comparator 22, a step size selector 24, a Step Size Selector for StepU module 35, a downlink (DL) transmission power (TxP) modifier 26, and a downlink (DL) transmitter (TxP) 28 for generating radio frequency signals to the UE via antenna 14. Some of these modules may in fact be part of the same module, such as the TPC command decoder and the TPC command evaluation module.

Receiver 12 receives the UE radio frequency signal and transfers the received signal to the TPC command decoder 16 (which may be part of a general decoder module) as well as to the reception quality measurement module 18. The reception quality measurement module typically measures either the signal-to-interference ratio (SIR) or the bit error rate (BER) at the BS. The output of the TPC command decoder is transferred to the TPC command evaluator 20 (which may be part of the TPC command decoder 16). The TPC command evaluator determines if the TPC command is erroneous; that is, has a value of "01"or "10". If the TPC command is erroneous, a signal is transferred via line 31 to a Step Size Selector for StepU module 35, which in turn sets the TPC command to be UP and the step size to be small. The output of this module is transferred to downlink transmission power modifier module (DL TxP) 26 which in turn controls the downlink transmitter 28 via line 39.

If the TPC command is not erroneous, the TPC command evaluator 20 generates an output on line 32, to the Step Size Selector 24. The step size selector module 24 also receives the output of the reception quality to threshold comparator 22.

The reception quality to threshold comparator 22 receives the output of the SIR or BER measurement module 18 via line 19. The operation of the reception quality to threshold comparator 22 is to compare the SIR or BER value to two or more threshold values in order to determine the maximum threshold which is exceeded by the SIR or BER value, or if no threshold is exceeded. The resulting comparison is presented as an output on the corresponding $Threshold_1$, $Threshold_2$, . . . , $Threshold_N$ output line, depending upon which threshold is first exceeded by the comparator. If no threshold is exceeded, the NO THRESHOLD output 30 is selected by the comparator. If the NO THRESHOLD output 30 is activated, it causes module 24 to choose a StepU with a small value regardless of the TPC command received from the TPC evaluator 20.

All these threshold evaluations are presented to the step size selector 24 for purposes of determining the step size (StepU) for increasing the downlink (DL) transmission power (TxP) for the base station or for determining the step size (StepD) for decreasing the DL TxP. The values of StepU are various positive values and the values of StepD are various negative values.

Figure 2A:
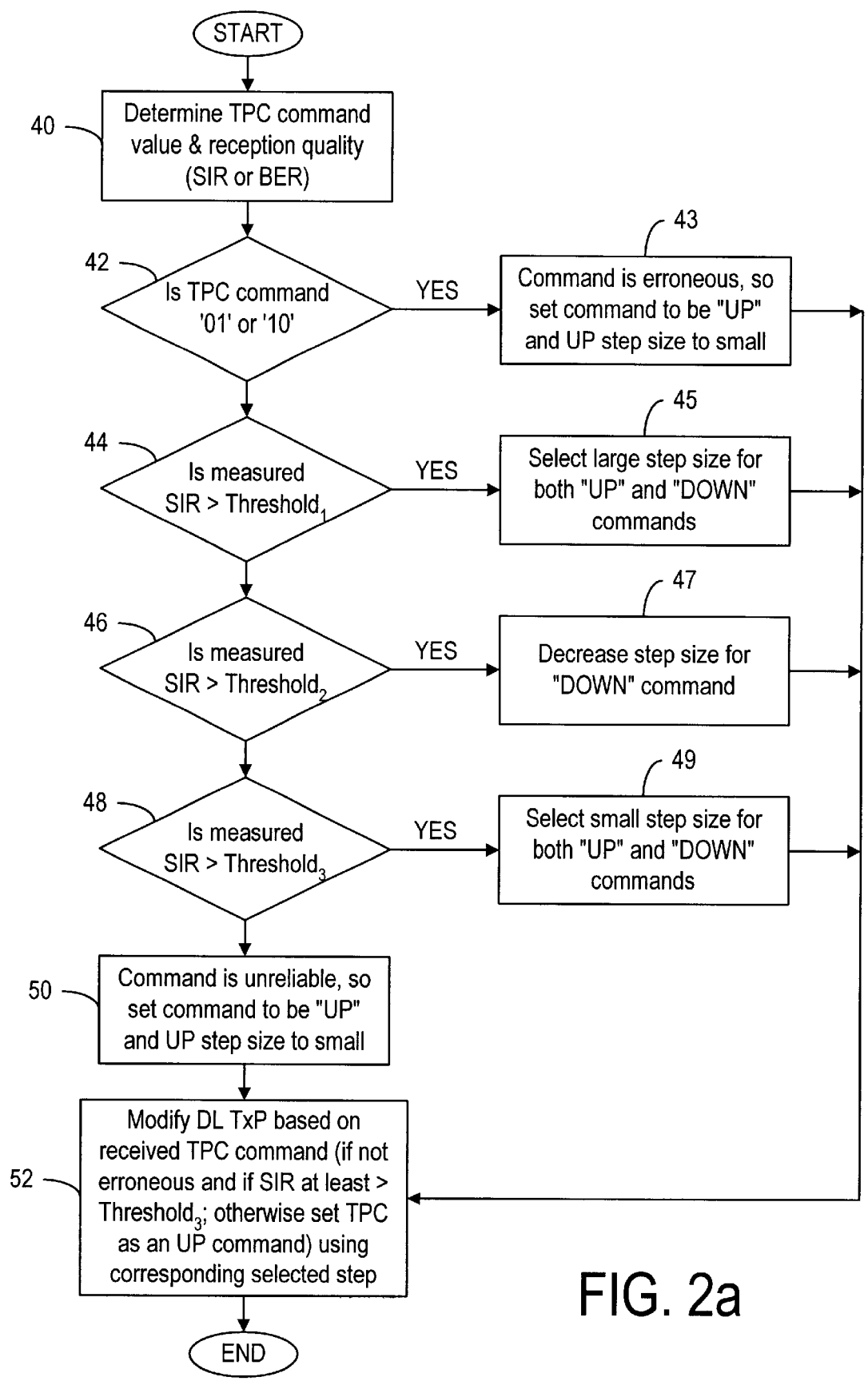
FIG. 2a is a flow chart showing the procedure for determining both the UP and DOWN step sizes for downlink transmission power modification based upon received signal conditions, as well as scenarios for determining step size when an erroneous transmission power control command (TPC) is received. It is not assumed that SIR is correlated to BER.
Figure 2B:
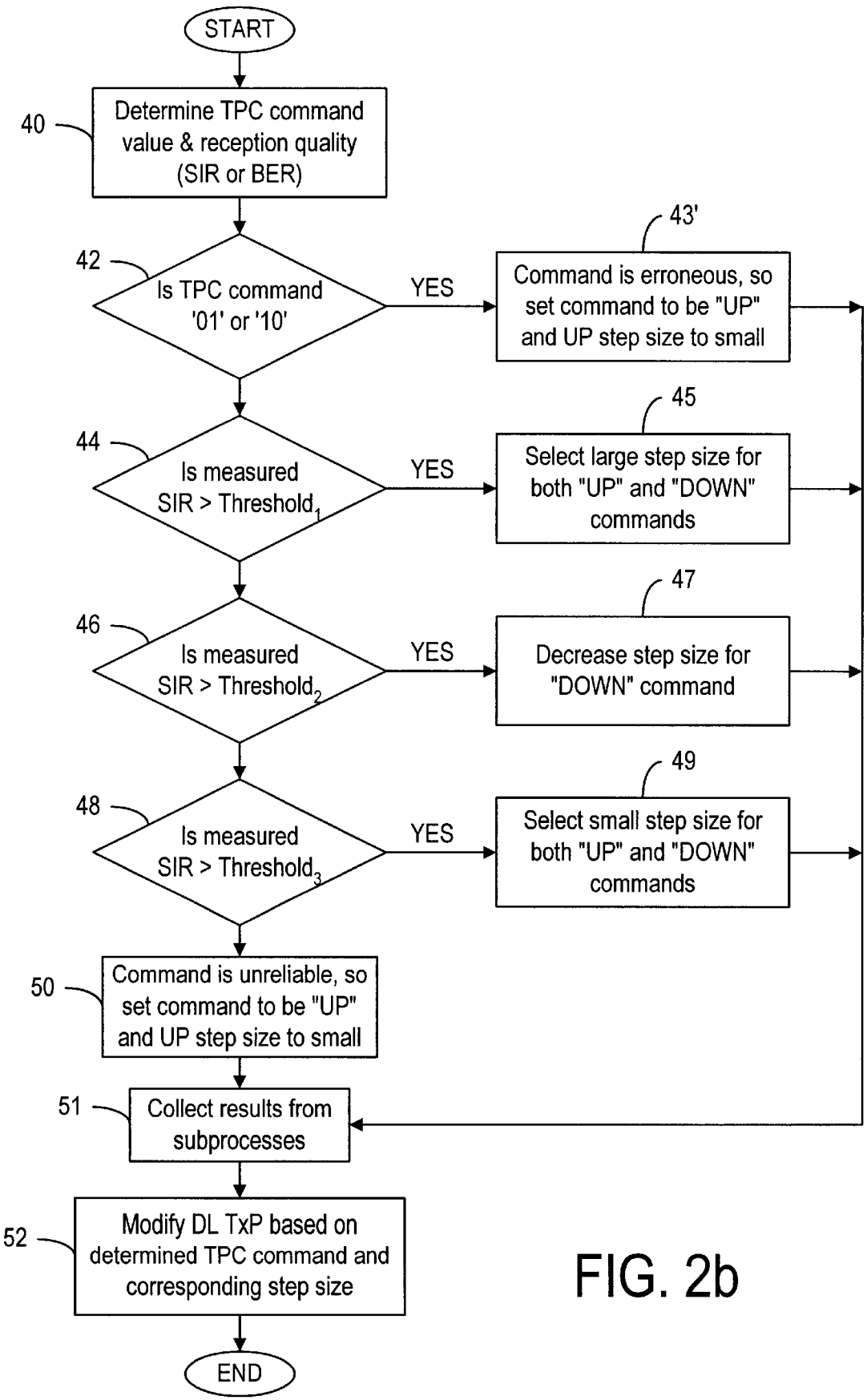
FIG. 2b is a flow chart similar to FIG. 2a in which the algorithm presented assumes that SIR and BER in the TPC word are correlated and thus TPC command extraction and comparison of the SIR value to received signal conditions are performed in parallel.

$Threshold_1$ is the highest threshold and represents a situation where the reception quality is perceived to be good, resulting in selection of a large step size for both the "UP" and "DOWN" step sizes (StepU and StepD). $Threshold_2$ represents a situation where the reception quality is not as good as $Threshold_1$ and as a result the step size for the down command (StepD) is typically reduced from its previous value. $Threshold_3$ represents a situation where the previous two thresholds are not exceeded and as a result the reception quality is considered to be marginal, resulting in selection of a small step size for both the UP and DOWN command (StepU and StepD). FIG. 1 shows that there can be up to N different thresholds which in the given examples shown in FIGS. 2a and 2b is three, but which could be any value greater than one.

If none of the three thresholds are exceeded by the SIR or BER measurement, then the No Threshold comparison line 30 is true, resulting in the step size selector setting the UP step size (StepU) to a small value (regardless of the value of the TPC command received from TPC command evaluator 20). The output of the step size selector as previously indicated is transferred to the downlink transmission power modifier 26 for control of the downlink transmitter based upon the received TPC command.

The output of the step size selector 24 thus represents the current value for StepU or StepD. This current step size is presented to the DL TxP modifier 26 via line 33. The DL TxP modifier 26 generates an output signal on line 39 which represents the downlink transmission power level based upon the step size received via line 33 if the TPC command is valid and via line 37 if the TPC command is erroneous. Thus if the DL TxP power level value is P before the last TPC command was received and if a StepU step size was received via line 33, the DL TxP power level would be replaced by P+StepU, and this value would be presented to the downlink transmitter 28 (that is, the power level value P of module 26 is equal to the previous power level P plus the value of StepU).

The output of the DL TxP modifier 26 via line 39 controls the transmission power of the downlink transmitter 28, which in turn transmits radio frequency signals via antenna 14 back to the UE.

As seen in FIG. 1, if the TPC command is erroneous, then output line 31 is selected which causes the Step Size Selector for StepU 35 to select a small step size for the UP command (StepU). In this situation and in the situation where the minimum threshold value ($Threshold_N$) is not exceeded, the TPC command is effectively an UP command.

It should further be noted that the TPC command evaluator 20 can detect only one bit errors in the TPC command. If both bits of the two-bit TPC command are in error, the resulting TPC command is valid (00 become 11 or 11 becomes 00). Such double-bit errors are of course most likely when SIR is low (poor signal conditions). In such situations the higher thresholds (e.g. $Threshold_1$, $Threshold_2$) are not exceeded by the measured SIR and therefore only small step sizes for both UP and DOWN commands will be used. This procedure greatly minimizes the undesirable effect of using an incorrect TPC command.

FIGS. 2a and 2b are flow charts which show the operation of the present invention in two embodiments. In FIG. 2a, the flow chart does not assume that the UE SIR is correlated with the BS BER; whereas in FIG. 2b, it is assumed that UE SIR and BS BER are correlated and thus TPC command extraction and comparison of the SIR value to the reception quality are performed in parallel.

Referring to FIG. 2a, the procedure starts with determining the TPC command value and the reception quality, using either SIR or BER (step 40 at the BS). Following that, decision step 42 determines if the TPC command is erroneous, that is, whether it has a value of "01" or "10". If this decision is true, the command is determined to be erroneous and causes the UP step size (StepU) to be set to a small value, such as 1 dB (see step 43). If the TPC command is not erroneous, the reception quality, such as SIR, is compared to the highest threshold, Threshold, at step 44. If this threshold is exceeded, indicative of a high reception quality, then at step 45 a large step size is selected for the UP and DOWN commands (StepU and StepD). These step sizes could be, for instance, 3 dB, or the UP step size could be 3 dB and the DOWN step size 2 dB, or some other values as required for a particular UE-BS environment. It is important to note however that the step UP and step DOWN sizes do not need to be the same as they are in prior art systems.

If the first threshold value is not exceeded, comparison step 46 is executed, determining if the reception quality is greater than $Threshold_2$. If this threshold is exceeded, step 47 typically would decrease the step size for the DOWN command (StepD) by some amount, such as 1 dB. Thus if StepD was 3 dB, it would be reduced to 2 dB.

If decision step 46 is negative, then decision step 48 is executed to determine if the reception quality is greater than a third threshold ($Threshold_3$). Such a threshold would be indicative of a marginal reception quality and therefore indicative of a situation where the TPC command, though not determined to be erroneous, may in fact be erroneous and therefore putting less reliability in the TPC command. As a result, step 49 causes both the UP and DOWN step sizes (StepU and StepD) to be set to a small value, such as 1 dB. If decision step 48 is negative, then it is determined that the TPC command is not reliable, even though it is not erroneous and thus at module 50, the TPC command is evaluated to an UP command (even if step 40 determined the TPC not to be an UP command) and the UP step size is set to a small value, such as 1 dB.

At step 52, the downlink transmission power level is modified by the selected step size for either the UP or DOWN step, depending upon TPC command evaluated or, if the TPC command is found to unreliable or erroneous, it is set to be an UP command regardless of its value (as determined at step 40, see also TPC command decoder 16, FIG. 1). This new power level controls the actual power level of the downlink transmitter 28 (see FIG. 1).

FIG. 2b is basically similar to FIG. 2a with the exception that if the TPC command at decision step 42 is true (representative of an erroneous TPC command), then step 43 sets the TPC command to be an UP command with a small step size (StepD). Module 51 collects the results from modules 43', 45, 47, 49 and 50, so as to determine which module result takes precedence. Thus, for instance, if module 42 has a YES result, module 43' would have precedence. If module 50 determines an unreliable TPC command, its results take precedence. If the TPC command exceeds a particular threshold, the corresponding module values take precedence.

The module value with precedence is then presented to module 52 so as to modify the downlink transmit power value.

Thus what is shown in flow charts of FIGS. 2a and 2b is a method for selecting the step size for both increasing or decreasing downlink transmission power in which the size of the step is dependent upon the reception quality of the received signal from the UE and particular, the TPC command reception quality. The step size for the UP and DOWN modification of the downlink transmission power need not be equal to each other and in fact, may be different depending upon reception quality. The overall result is that in a UTRA TDD system, fast fading situations can be more effectively countered by modification of the downlink transmission power in a manner which does not make the overall system vulnerable to excessive increasing of the downlink transmission power due to unreliable TPC command evaluation due to poor reception quality.

Figure 3:
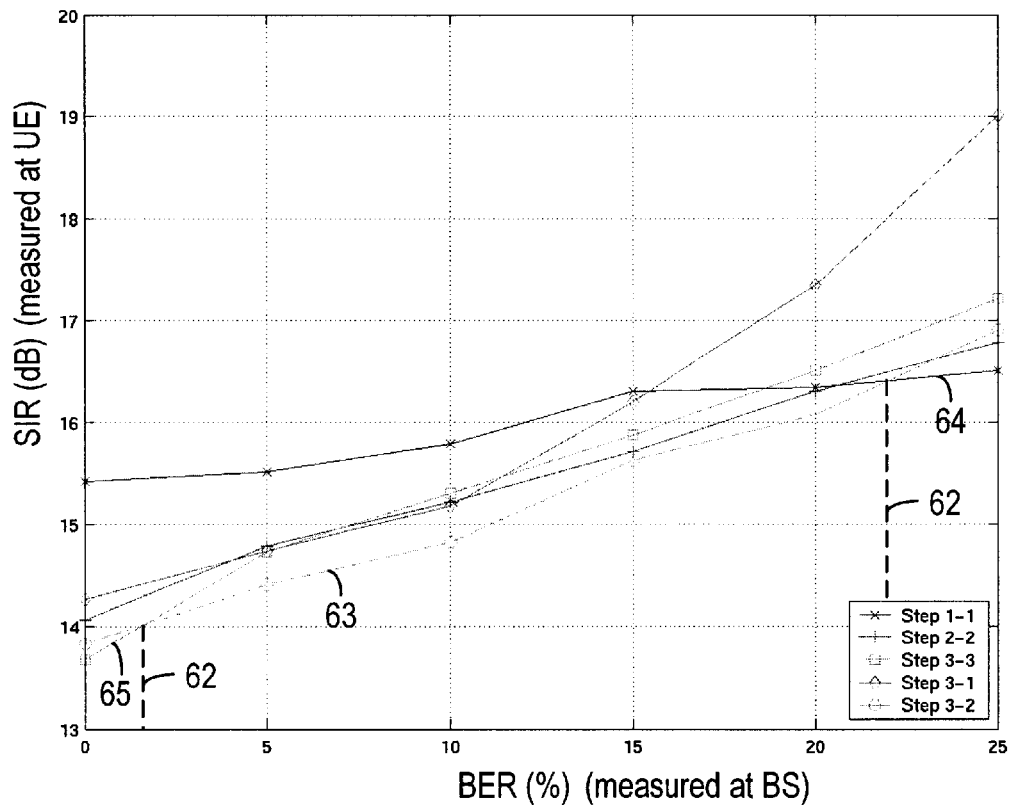
FIG. 3 displays simulation test results from dynamic systems simulation of one base station and one user equipment (UE) that presents UE SIR as a function of BS BER, showing performance of the system in view of various step sizes for increasing downlink transmission power (StepU) and deceasing downlink transmission power (StepD)

FIG. 3 shows simulation results from dynamic system simulation with one base station and one UE that presents SIR (measured at the UE) as a function of BER (measured at the BS). As seen in the figure, relatively large step sizes of 3 dB, both in the UP and DOWN direction (plot step 3-3, line 63), as well as 3 dB UP and 2 dB DOWN (plot step 3-2, line 65) give the best performance in terms of lowest UE SIR with low BS BER values. It is there seen that a 3 dB4 UP and a 2 dB DOWN step size gives the best performance between a 2% BER and 22% BER as shown by dashed lines 60 and 62. If BER increases beyond 22%, then the step size for the DOWN command should be decreased such as seen by plot step 1-1 line (64).

For BER less than 2%, either the plot step 3-2 (line 63) or plot step 3-3 line (65) gives the best performance.

Figure 4:
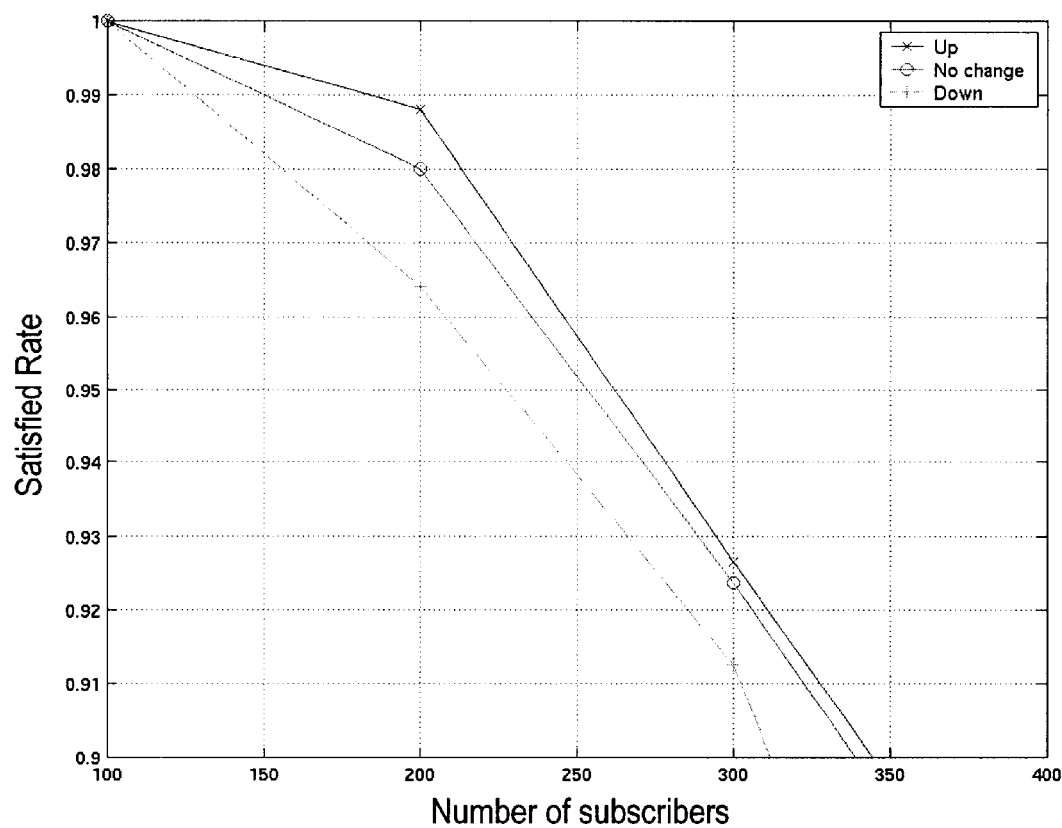
FIG. 4 is a chart showing simulation results from dynamic system simulation with four base stations operating in an indoor environment that presents satisfied rate as a function of the number of subscribers.

FIG. 4 shows simulation results and dynamic system simulation with four base stations operating in an indoor environment that presents a satisfied rate as a function of the number of subscribers. For the downlink control, it is seen that the power control step sizes (UP and DOWN) of 1 dB were used and errors in TPC bits are generated according to uplink (UL) BER. In case of an erroneous TPC command, that is a TPC value of "01" or "10", either DOWN, NO CHANGE, or UP command can be selected for the TPC command, with the figure showing that the best performance can be achieved when the UP command is used (as used in the algorithms of FIGS. 2a and 2b).

In summary, when a base station measures the reception quality of the received signal (e.g. by measuring SIR or BER), it evaluates the reliability of the received TPC command. The reception quality is compared to different thresholds and the appropriate step size for both the UP and DOWN steps for increasing and decreasing downlink transmission power levels can be determined. If an erroneous TPC command is received, it is beneficial to interpret the TPC command to be an UP command and to increase the downlink transmission power with a small step size.

If the TPC command is not erroneous, then the measured SIR (or BER) is compared against various thresholds and depending upon the threshold, large step sizes can be used for both the UP and DOWN step sizes if good reception quality is determined or the UP and DOWN step sizes can be chosen to be asymmetric (different) with respect to each other (although larger than they would be if the reception quality is determined to be relatively poor). For poor reception quality, the step sizes are typically chosen to be small in order to minimize the effects of erroneous interpretation of the TPC command due to poor reception quality. Furthermore, if the reception quality is determined to be below a minimum threshold, then the TPC command is set as an UP command and the step size UP (StepU) is set to a small step size. Thus the advantage of the present invention is the ability to use asymmetric step sizes for UP and DOWN power control without the need for the base station to receive information from a radio network control (RNC), but rather using the reception quality of the signal from the UE as the basis for determining what sizes to use. Better modification of DL TxP is thereby achieved.

Having described the invention, what is claimed is:

1. A method to select the step size for increasing (StepU) the transmission power and the step size for decreasing (StepD) the transmission power of a transmitter based upon the reception quality of a received signal, comprising the steps of:

1) determining the reception quality of a received signal; and 2) for each integer i, where i ranges from one to N, where N is an integer greater than one, comparing the reception quality to a threshold$_i$, and if the reception quality is greater than threshold$_i$, selecting step size StepU$_i$ for increasing the transmission power and step size StepD$_i$ for decreasing the transmission power and then terminating all further comparisons of reception quality to lower thresholds, if i<N;

where thresholds$_{i, i+1, \ldots, N}$ decrease monotonically.

2. A method as claimed in claim 1, where step size StepU$_i \geq$ StepU$_{i+1}$ for all i.

3. A method as claimed in claim 2, where step size StepD$_i \geq$ StepD$_{i+1}$ for all i.

4. A method as claimed in claim 1, where step size StepD$_i \geq$ StepD$_{i+1}$ for all i.

5. A method as claimed in claim 3, further including the step of determining the value of a transmission power control command (TPC).

6. A method as claimed in claim 5, wherein if the value of the TPC command is indicative of an erroneous TPC command, then setting the step size for increasing transmission power (StepU) to a predetermined value and skipping all comparisons between received signal quality and said thresholds (threshold$_{i, i+1, \ldots, N}$), and if the value of the TPC command is not indicative of an erroneous TPC command, performing step 2.

7. A method as claimed in claim 6, wherein the step size for increasing transmission power (StepU) for an erroneous TPC command is set to the value of StepU$_N$.

8. A method as claimed in claim 7, further wherein if step 2 is performed and if the reception quality is not greater than threshold$_N$, then setting the step size for increasing transmission power (StepU) to a predetermined value.

9. A method as claimed in claim 8, wherein the step size for increasing transmission power (StepU) is set to the value of $StepU_N$.

10. A method as claimed in claim 9, further wherein the transmission power of the transmitter is increased or decreased depending upon the value of the transmission power control command (TPC) and wherein the size of the increase or decrease of the transmission power is set to the selected step size (StepU or StepD).

11. A method as claimed in claim 5, further wherein the transmission power of the transmitter is increased or decreased depending upon the value of the transmission power control command (TPC) and wherein the size of the increase or decrease of the transmission power is set to the selected step size (StepU or StepD).

12. A method as claimed in claim 1, further wherein if the reception quality is not greater than $threshold_N$, then setting the step size for increasing transmission power (StepU) to a predetermined value.

13. A method as claimed in claim 12, wherein the step size for increasing transmission power (StepU) is set to the value of $StepU_N$.

14. A method as claimed in claim 5, wherein the reception quality of the received signal is the signal-to-interference ratio (SIR) value of the received signal.

15. A method as claimed in claim 1, wherein the reception quality of the received signal is the signal-to-interference ratio (SIR) value of the received signal.

16. A method as claimed in claim 1, wherein step size $StepU_i$ and step size $StepD_i$ are the same for at least when i is equal to N.

17. A method as claimed in claim 1, wherein step size $StepU_i$ and step size $StepD_i$ are not equal to each other for at least one value of i if i is less than N.

18. A method as claimed in claim 1, further wherein if the reception quality is not greater than $threshold_N$, then setting the step size for increasing transmission power (StepU) to a predetermined value.

19. A method as claimed in claim 18, wherein the step size for increasing transmission power (StepU) is set to the value of $StepU_N$.

20. A device to select the step size for increasing (StepU) the transmission power and the step size for decreasing (StepD) the transmission power of a transmitter based upon the reception quality of a received signal, comprising:
means for determining the reception quality of a received signal;
means for comparing the reception quality of the received signal to a plurality of threshold values so as to generate an output signal indicative of such comparison wherein the comparing means for each integer i, where i ranges from one to N, where N is an integer greater than one, compares the reception quality to a $threshold_i$, and if this $threshold_i$ is exceeded then generating the output signal indicative thereof and terminating all further comparisons of reception quality to lower thresholds, if i<N; where $threshold_{i, i+1, \ldots, N}$ decrease monotonically; and
means for selecting UP and DOWN step sizes (StepU and StepD) based upon the output signal of the comparing means.

21. A device as claimed in claim 20, where the UP step size if $threshold_i$ is exceeded is denoted $StepU_i$, and further where step size $StepU_i \geq StepU_{i+1}$ for all i.

22. A device as claimed in claim 21, where the DOWN step size if $threshold_i$ is exceeded is denoted $StepD_i$, and further where step size $StepD_i \geq StepD_{i+1}$ for all i.

23. A device as claimed in claim 20, where the DOWN step size if $threshold_i$ is exceeded is denoted $StepD_i$, and further where step size $StepD_i \geq StepD_{i+1}$ for all i.

24. A device as claimed in claim 20, further comprising means for determining the value of a transmission power control command (TPC), and wherein if the means for determining the value of the TPC command determines a value which is indicative of an erroneous TPC command, then setting the step size for increasing transmission power (StepU) to a predetermined value and skipping all comparisons between received signal quality and said thresholds ($threshold_{i, i+1, \ldots, N}$), and if the value of the TPC command is not indicative of an erroneous TPC command, performing said comparisons between the reception quality of the received signal and said thresholds.

25. A device as claimed in claim 24, wherein the step size for increasing transmission power (StepU) for an erroneous TPC command is set to the value of $StepU_N$ and where the system further comprises means for setting the TPC command to an UP command.

26. A device as claimed in claim 25, further wherein for the comparing means, if the reception quality is not greater than $threshold_N$, then setting the step size for increasing transmission power (StepU) to a predetermined value.

27. A device as claimed in claim 26, wherein the step size for increasing transmission power (StepU) is set to the value of $StepU_N$.

28. A device as claimed in claim 27, further comprising means for determining the value of a transmission power control command (TPC), and further wherein the transmission power of the transmitter is increased or decreased depending upon the value of the transmission power control command (TPC) and wherein the size of the increase or decrease of the transmission power is set to the selected step size (StepU or StepD).

29. A device as claimed in claim 20, further comprising means for determining the value of a transmission power control command (TPC), and further wherein if the reception quality is not greater than $threshold_N$, then setting the step size for increasing transmission power (StepU) to a predetermined value and wherein the system further comprises means for setting the TPC command as an UP command regardless of the TPC command received.

30. A device as claimed in claim 29, wherein the step size for increasing transmission power (StepU) is set to the value of $StepU_N$.

31. A device as claimed in claim 20, wherein the reception quality of the received signal is the signal-to-interference ratio (SIR) value of the received signal.

32. A device as claimed in claim 20, wherein the reception quality of the received signal is the signal-to-interference ratio (SIR) value of the received signal.

33. A device as claimed in claim 20, wherein step size $StepU_i$ and step size $StepD_i$ are the same for at least when i is equal to N.

34. A device as claimed in claim 20, wherein step size $StepU_i$ and step size $StepD_i$ are not equal to each other for at least one value of i if i is less than N.

35. A system to select the step size for transmission power of a first device comprising the device of claim 20 and further comprising a second device for generating a signal that the first device uses as said received signal.

* * * * *

UNITED STATES PATENT AND TRADEMARK OFFICE
CERTIFICATE OF CORRECTION

PATENT NO. : 6,760,598 B1
DATED : July 6, 2004
INVENTOR(S) : Kurjenniemi

It is certified that error appears in the above-identified patent and that said Letters Patent is hereby corrected as shown below:

Column 9,
Line 65, please delete "claim 23" and substitute therefor -- claim 21 --.

Signed and Sealed this

Nineteenth Day of October, 2004

JON W. DUDAS
*Director of the United States Patent and Trademark Office*